United States Patent [19]

Maddestra et al.

[11] 4,003,144
[45] Jan. 18, 1977

[54] EDUCATIONAL BLOCK WITH REPLACEABLE CHIP

[75] Inventors: Robert Maddestra, Canton; David E. Munn, Framingham, both of Mass.

[73] Assignee: Damon Corporation, Needham Heights, Mass.

[22] Filed: July 11, 1975

[21] Appl. No.: 595,301

[52] U.S. Cl. .................................. 35/70; 46/26
[51] Int. Cl.² ................................ A63H 33/08
[58] Field of Search .......... 35/16, 69, 70, 71, 18 A; 46/23, 25, 26

[56] References Cited

UNITED STATES PATENTS

| | | | |
|---|---|---|---|
| 319,764 | 6/1885 | Westcott | 46/25 |
| 956,632 | 3/1910 | Finch | 46/26 |
| 1,314,541 | 9/1919 | Seeger | 35/71 |
| 1,682,686 | 8/1928 | Rutherford | 35/71 |
| 1,895,611 | 1/1933 | Doak | 35/70 |
| 2,202,956 | 6/1940 | Lee | 35/16 |
| 2,855,206 | 10/1958 | Haviland | 46/25 X |
| 2,885,822 | 5/1959 | Onanian | 46/26 |
| 3,148,477 | 9/1961 | Bjorn | 46/25 |
| 3,205,611 | 9/1965 | Onanian | 46/26 |
| 3,488,881 | 1/1970 | Holzer | 46/26 X |
| 3,491,196 | 1/1970 | Stein | 35/71 |

FOREIGN PATENTS OR APPLICATIONS

| | | | |
|---|---|---|---|
| 24,541 | 4/1922 | France | 46/26 |
| 744,850 | 2/1956 | United Kingdom | |

*Primary Examiner*—Harland S. Skogquist
*Attorney, Agent, or Firm*—Kenway & Jenney

[57] ABSTRACT

An educational alphabet block formed of a polymeric material and having the configuration of a cube with a square recess on each face for receiving a removable chip. Each face of the block also defines an aperture. The aperture reduces the weight of the block without reducing its strength and also provides a means for inserting rods into the block.

The chip is fabricated of a polymeric material and includes opposed flexible lips about a groove around the perimeter of the chip. The flexible lips facilitate the ease with which chips are inserted and removed from a recess in the face of the block. The groove enables the lip of one chip to be used to remove another chip secured in a recess in the block.

The chip may have appropriate legends such as letters of the alphabet, numerals or scenes printed on one or both faces. Alternatively, the chips may define a central aperture for the insertion of rods into the blocks.

The chips themselves have a thickness substantially twice the depth of the recess on the face of the block in order that a single chip may be used to fasten opposed faces of two blocks together.

The square configuration of the chips prevents the movement of mated faces when secured together.

4 Claims, 6 Drawing Figures

EDUCATIONAL BLOCK WITH REPLACEABLE CHIP

BACKGROUND OF THE INVENTION

The present invention is directed to educational blocks of the type which include replaceable faces which are secured in recesses on the face of the blocks. The removable faces (or chips as they are called in this specification and claims) serve two main purposes. First of all, they enable structures to be created by utilizing a common chip to secure two blocks together. A second advantage of having a block with replaceable faces is that a single block with replaceable faces can enable a block to be provided with a larger number of symbols, such as letters and numerals, on its faces.

A patent which is representative of the prior art is U.S. Pat. No. 1,895,611 to Doak, entitled Building Blocks. A significant disadvantage of the blocks disclosed in the Doak patent is that it is difficult to remove the replaceable faces of the block. Furthermore, the configuration of the Doak block does not provide a block with a weight to strength ratio that is as acceptable as the weight to strength ratio of the block of the present invention.

Accordingly, an object of the present invention is to provide an educational building block with a weight to strength ratio that is superior to prior art blocks.

A further object of the present invention is to provide a building block with replaceable faces in which the replaceable faces can be removed with greater facility than similar prior art blocks.

DESCRIPTION OF THE PREFERRED EMBODIMENTS

Figure 1:
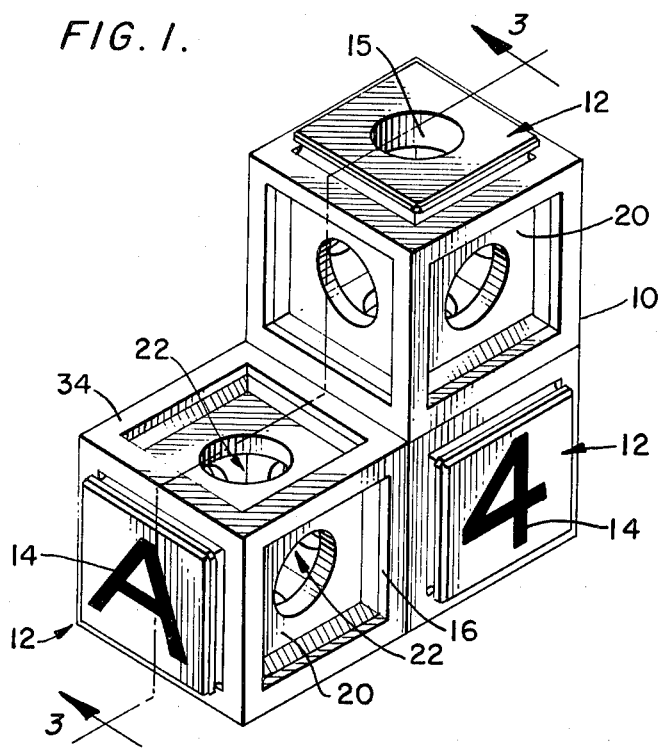
FIG. 1 is a perspective view of three building blocks in accordance with the present invention which are joined together.
Figure 2:
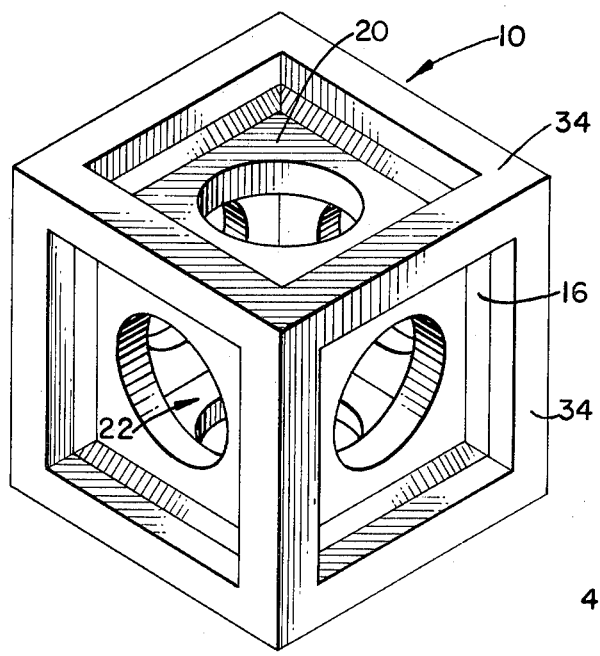
FIG. 2 is a perspective view of a block in accordance with the present invention with all of the chips removed.
Figure 3:
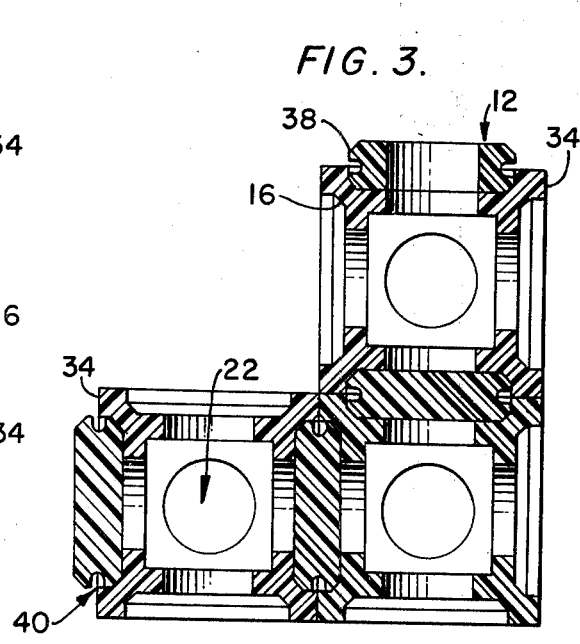
FIG. 3 is a cross-sectional view taken along line 3—3 of FIG. 1.

The educational block of the present invention includes a block 10 which is designed to accept and hold chips 12. As is shown in the drawing, chip 12 has an appropriate legend 14 thereon. Legend 14 may be included on both sides of the chip and may include letters of the alphabet, numerals, scenes or any number of symbols normally used on educational blocks. Chip 12 may define a central aperture 15 as is shown in FIG. 1. The function of aperture 15 is to receive rods (not shown).

To enable block 10 to receive chip 12, block 10 is formed with shoulders 16 which are beveled at an angle to correspond to the beveled edge of chip 12. As is shown in the drawing, chips 12 fit into recesses formed on each of the six faces of the block. The thickness of chip 12 is about twice the depth of the recess in order that the chips may be used to fasten blocks together.

For structural support, with a minimum amount of material, the block is inclusive of a recessed wall portion 20 which defines an aperture 22. The purpose of the aperture 22 is to reduce the amount of material needed to fabricate the block, without reducing its structural strength. Another purpose of the recess is that it enables the insertion of rods through the block; thus, when the chip 12 is provided with a central aperture 15, a rod (not shown) can be inserted through the block enabling a child to create structures which include both blocks and rods. The recess wall portion 20 which defines aperture 22 is of the same size and shape as the face 24 of chip 12.

Figure 6:
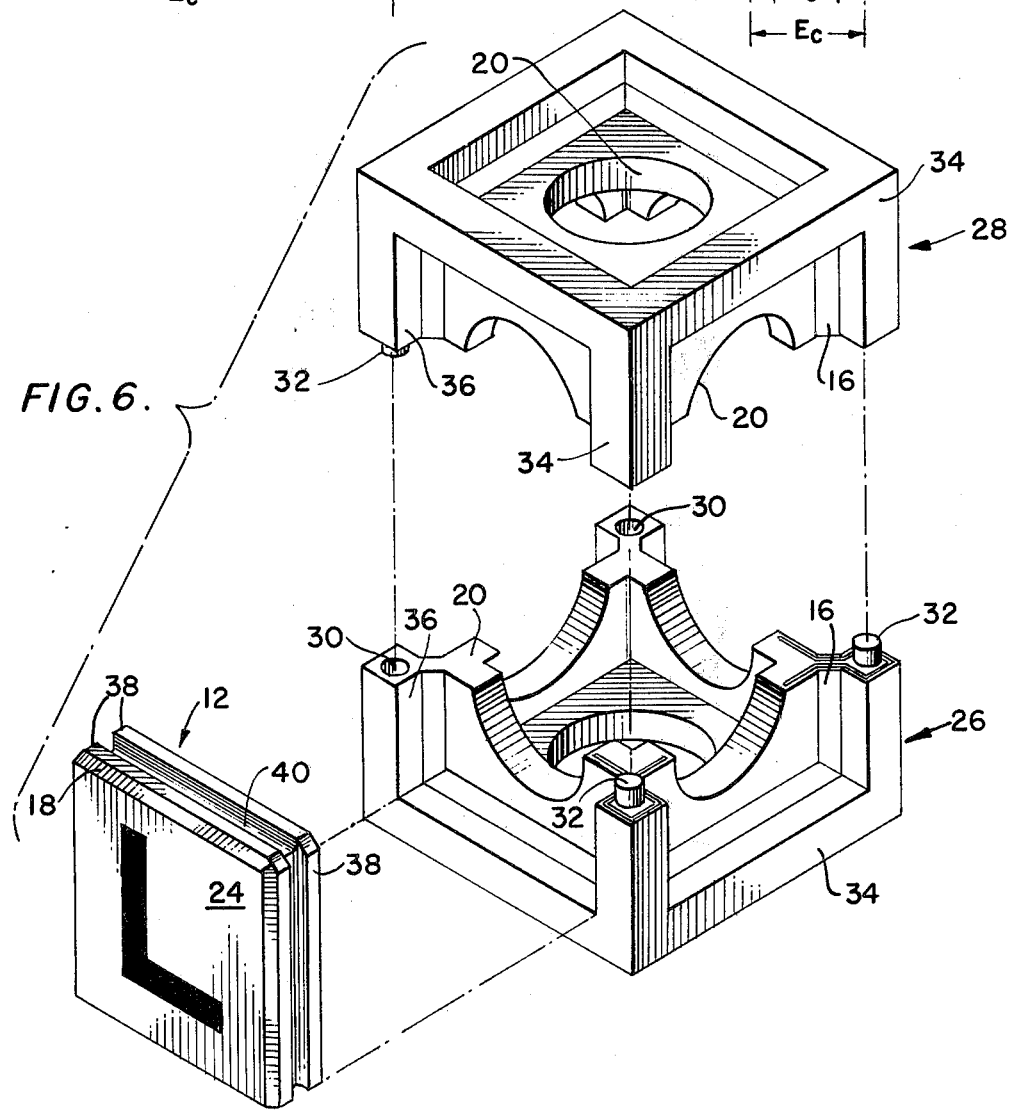
FIG. 6 is an exploded perspective view of two components which form the block of the present invention.

As is shown in FIG. 6, blocks 10 are fabricated by injection molding two halves 26, 28. To secure the two halves 26 and 28 together and form a block, each half is inclusive of a pair of recesses 30 and a pair of posts 32. By injection molding two mated halves as is shown in FIG. 6, it is possible to mold a structure which is extremely strong while at the same time containing a minimum amount of material. The foregoing arrangement enables the block to be fabricated with an outer wall 34, an edge 36, which frames the recessed area and which forms a recess generally of the same width and length as chip 12, and with shoulder 16 which connects edge 36 to the recess wall portion 20.

Chip 12 is inclusive of two flexible resilient lips 38 which are separated about the perimeter of the chip by a groove 40. Because the lip 38 is flexible, chip 12 may be fabricated to be slightly wider and longer than the width and length of the edge 36 of the recessed area. At this point it should be noted that since the chip is square in configuration, the dimensions of length and width are equal. Thus, chip 12 is fabricated so that the lip 38 makes a good friction fit with edge 36 of block 10.

An advantage of the chip of the present invention is that it is more easily removed than corresponding faces of known prior art blocks. The reason for this fact is that one chip can be used to pry out a chip which has been placed in the block. To accomplish the foregoing, a lip 38 of one chip is placed in the groove 40 of a chip which is secured in a block. By prying up or twisting the hand held chip, the other chip is removed easily from the block.

Preferably the halves 26 and 28 of block 10 are injection molded from a high impact polystyrine. Of course, there are numerous polymeric materials that can be used to mold halves 26 and 28. However, a high-impact polystyrene having a Rockwell hardness between the range of R30-100, a specific gravity between the range of 1.04 – 1.10 and a specific volume in Cu in/1b between the ranges of 28.1 – 25.2 is preferred.

When selecting a polymer for clip 12, it is important that the lip 38 flex somewhat to facilitate insertion and removal from the block. Two polymers that can be employed to great advantage in forming drip 12 are low density polyethylene and unmodified polypropylene. However, a low density polyethylene having a Shore D hardness in the range of D41-D50, a specific gravity of 0.910- 0.925 and a specific volume in Cu in/lb between the range of 30.4 – 29.9 is preferred.

Figure 4:
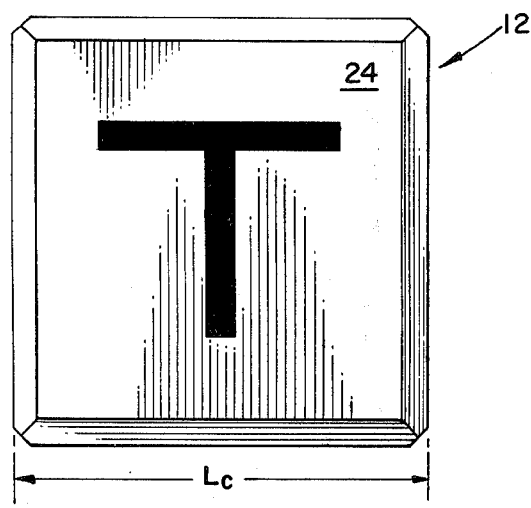
FIG. 4 is a plan view of a chip for insertion into the block of the present invention.
Figure 5:
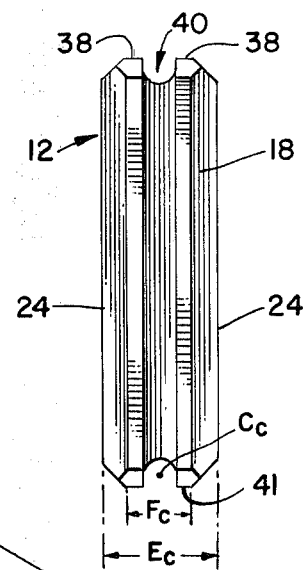
FIG. 5 is a view of an edge of a chip of the present invention.

To enable the good friction fit between the block 10 and chip 12, the opposed edges 36 of the recessed area are 0.745 inches apart; while, the overall width (and length) of chip 12 ($L_c$ of FIG. 4) is 0.754 inches, the overall thickness ($E_c$ of FIG. 5) of the chip is about 0.170 inches and the beveled edge of the chip makes an angle of about 45°. The flat edge of the chip ($F_c$ of FIG. 5) is about 0.124 inches wide. The groove is somewhat cylindrical in configuration with a center ($C_c$) being located 0.020 inches from the flat edge 41 of the chip and having a radius of .031 inches. The flat edge 41 is about 0.031 inches wide. The foregoing dimensions allow lip 38 to flex when being inserted or removed from block 10.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An educational block comprising a block and a removable chip in combination, said block being formed of a polymeric material and having the general configuration of a cube with a square recess of predetermined depth on each face for receiving the removable chip, each face of the block also defining an aperture for reducing the weight of the block without reducing its strength, said chip being fabricated of a polymeric material and including opposed flexible lips about a groove around the perimeter of the chip, each of said lips having a first predetermined thickness and said groove having a second predetermined thickness, the combined thickness of a lip and said groove being more than said recess depth, whereby an exposed portion of the groove of a first chip received in a block recess enables a second chip's lip to be received therein, whereby one chip can be used to remove another chip secured in a recess in the block, said chip also having a thickness substantially twice the depth of the recess on the face of the block in order that a single chip may be used to fasten opposed faces of two blocks together and wherein the chip has a square configuration to prevent the movement of mated faces when secured together.

2. The combination as set forth in claim 1 wherein said chip contains a legend.

3. The combination as set forth in claim 1 wherein said chip defines an aperture.

4. The combination as set forth in claim 1 wherein said block includes beveled shoulders forming each recess and wherein the edge of the chip is beveled at an angle to correspond to the beveled shoulders.

* * * * *